(12) United States Patent
Isaji

(10) Patent No.: US 7,504,990 B2
(45) Date of Patent: Mar. 17, 2009

(54) RADAR APPARATUS

(75) Inventor: Osamu Isaji, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 420 days.

(21) Appl. No.: 10/597,188

(22) PCT Filed: Jan. 14, 2005

(86) PCT No.: PCT/JP2005/000728

§ 371 (c)(1),
(2), (4) Date: Jul. 14, 2006

(87) PCT Pub. No.: WO2005/069037

PCT Pub. Date: Jul. 28, 2005

(65) Prior Publication Data

US 2008/0231501 A1    Sep. 25, 2008

(30) Foreign Application Priority Data

Jan. 15, 2004  (JP) .................................. 2004-8206

(51) Int. Cl.
*G01S 13/34* (2006.01)
*G01S 7/02* (2006.01)
(52) U.S. Cl. .................. 342/109; 342/107; 342/111; 342/116; 342/70
(58) Field of Classification Search .................. 342/107, 342/109, 111, 115, 116, 192, 70
See application file for complete search history.

(56) References Cited

U.S. PATENT DOCUMENTS 6,337,656 B1 * 1/2002 Natsume et al. ............. 342/149

6,646,589 B2 * 11/2003 Natsume ..................... 342/109
2001/0015698 A1 * 8/2001 Tokoro ........................ 342/70

FOREIGN PATENT DOCUMENTS

| JP | 11133142 | 5/1999 |
| JP | 11160423 | 6/1999 |
| JP | 11311668 A | 11/1999 |
| JP | 2000284047 | 10/2000 |

* cited by examiner

*Primary Examiner*—Ian J Lobo
(74) *Attorney, Agent, or Firm*—Fogg & Powers LLC

(57) ABSTRACT

Disclosed is a DBF radar apparatus comprising: an antenna for radiating a transmit signal; a plurality of antennas for receiving the transmit signal reflected from an object; a first selector switch section for sequentially selecting output terminals of the plurality of antennas one at a time for connection to an input terminal by performing switching with a first period; a first downconverting section for downconverting, by using a portion of the transmit signal, a received signal input from each antenna; a low-frequency cut-off filter connected to an output of the first downconverting section; a second selector switch section for connecting an output of the low-frequency cut-off filter to a sequentially selected one of a plurality of A/D converters; and a digital signal processing section for receiving outputs of the plurality of A/D converters, and for applying prescribed processing to the outputs to detect the distance to the object or the relative velocity with respect to the object, wherein, when each antenna is connected to the input terminal, the first selector switch performs on-off control with a second period shorter than the first period.

9 Claims, 20 Drawing Sheets

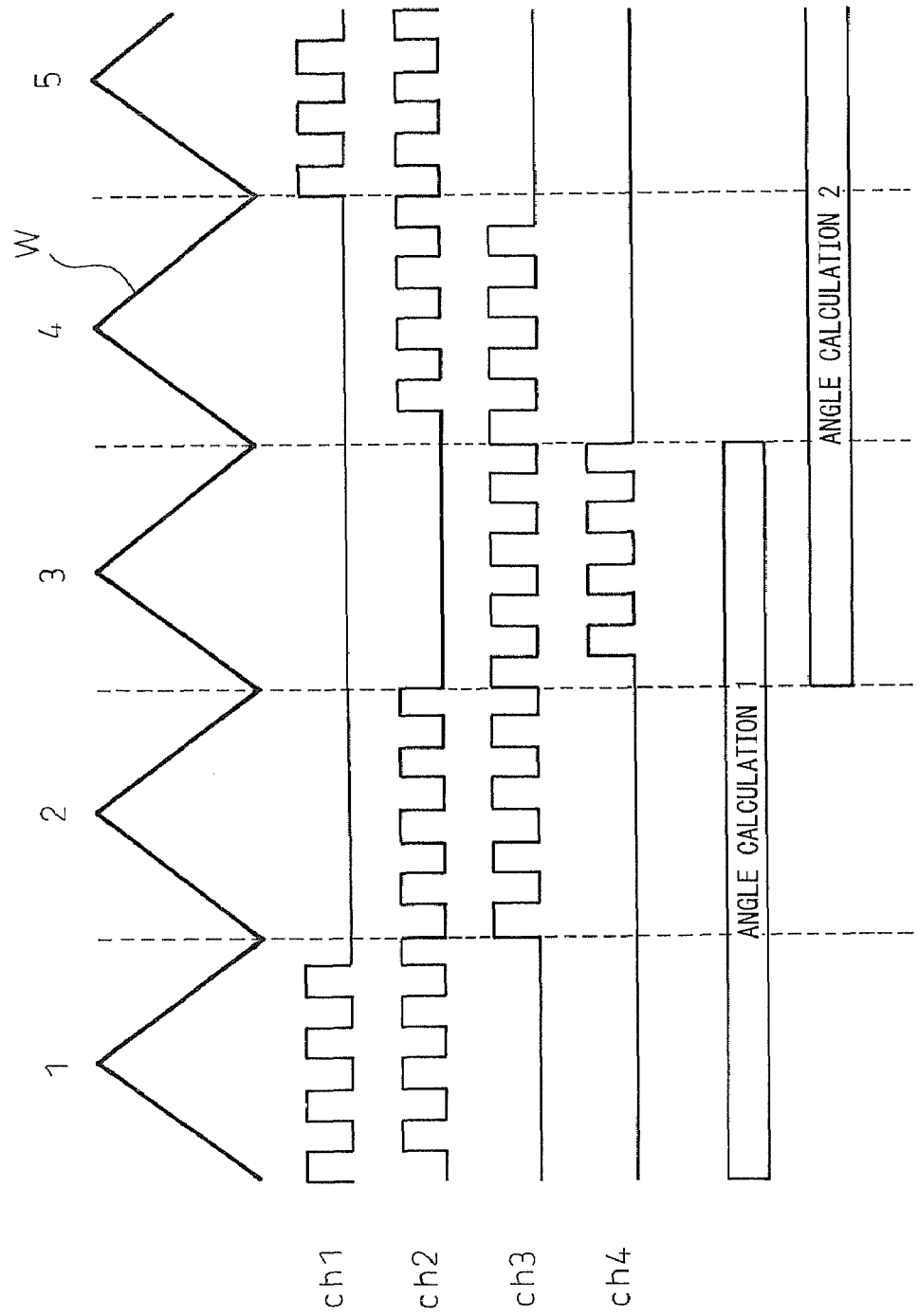

RADAR APPARATUS

TECHNICAL FIELD

The present invention relates to an FM-CW radar apparatus that uses a frequency-modulated (FM) continuous wave (CW) as a signal for transmission and, more particularly, to a DBF radar apparatus that performs digital beam forming.

BACKGROUND ART

A prior art DBF radar apparatus comprises: a transmitter section for radiating an electromagnetic wave as a transmit signal; an array antenna comprising a plurality of antenna elements for receiving, as a received signal, the electromagnetic wave reflected by an object; a plurality of input terminals connected to the respective antenna elements; an output terminal which is selectively connected by a switching means to one of the plurality of input terminals; and a receiver section in which the received signal obtained from the output terminal is downconverted by using a portion of the transmitted signal and the difference signal, representing the difference between the transmitted signal and the received signal, is converted into a digital signal, wherein the distance to or the relative velocity of the object is detected by applying prescribed processing to the digital signal obtained from the receiver section (JP H11-160423 A).

There is also disclosed a radar apparatus in which each antenna is sequentially connected, thereby eliminating the need to provide an RF receiver circuit for each antenna (JP H11-64485 A).

Further, in a radar apparatus in which each antenna is sequentially connected, it is disclosed that one antenna is set as a reference antenna and a beat signal produced from the signal received by the reference antenna is used for phase correction when combining signals by DBF (JP H11-311668).

There is disclosed a radar apparatus in which the receiver section includes a receive switch for sequentially selecting a plurality of receiving antennas, one at a time, by a select signal so that the receiver that generates a beat signal by mixing the received signal with a local signal is shared among the plurality of receiving antennas in a time-division fashion (JP2000-284047).

There is also disclosed a radar apparatus which transmits a frequency-modulated signal after switching it by a first switching signal, receives the signal reflected by a target object, mixes the received signal with the transmitted signal after switching the received signal by a second switching signal, and measures the distance and the relative velocity of the target object, based on the beat signal obtained, by further mixing the signal with a third switching signal (JP2003-172776).

DISCLOSURE OF THE INVENTION

The present invention provides a radar apparatus or, more specifically, a DBF radar apparatus wherein provisions are made to enhance the S/N ratio and to achieve efficient signal extraction. The invention also provides a radar apparatus wherein provisions are made to prevent signal components of different channels from mixing with each other at the time of channel switching even when a filter is placed after a mixer.

A radar apparatus according to the present invention comprises: a transmitter section having an antenna for radiating a transmit signal;

a receiver section having a plurality of antennas for receiving the transmit signal reflected from an object, a first selector switch section for sequentially selecting output terminals of the plurality of antennas one at a time for connection to an input terminal, a first downconverting section for downconverting, by using a portion of the transmit signal, a received signal input from each of the antennas to the input terminal via the first selector switch section, a low-frequency cut-off filter connected to an output of the first downconverting section for cutting off the DC component contained in the output, and a second selector switch section for connecting an output of the low-frequency cut-off filter to a sequentially selected one of a plurality of A/D converters; and a digital signal processing section for receiving outputs of the plurality of A/D converters, and for applying prescribed processing to the outputs to detect the distance to the object or the relative velocity with respect to the object, wherein the first and second selector switch sections both operate with the same switching period (first period), and an on-off control section is provided which performs on-off control with a second period shorter than the first period when the output terminal of each of the plurality of antennas is connected to the input terminal.

The on-off control section is constructed from an amplifier inserted between the first selector switch section and the first downconverting section, and the amplifier is controlled on and off, repetitively, with the second period shorter than the first period.

In one preferred mode, the on-off control section is contained in the first selector switch section, and the first selector switch section performs on-off control with the second period shorter than the first period when the output terminal of each of the plurality of antennas is connected to the input terminal.

The first selector switch section is constructed from amplifiers connected to the output terminals of the plurality of antennas, and the output terminals of the plurality of antennas are sequentially selected, one at a time, for connection to the input terminal by controlling the amplifiers on and off, wherein when the output terminal of each of the plurality of antennas is connected to the input terminal, the amplifier connected to the antenna is controlled on and off repetitively with the second period shorter than the first period.

The A/D converters are sampled periodically with a third period shorter than the second period.

According to the present invention, an amplifier is provided between the first selector switch section and the first downconverting section, and a second downconverting section is provided between the second selector switch section and the A/D converters, wherein the amplifier and the second downconverting section are controlled on and off repetitively with the second period.

According to the present invention, an amplifier is provided between the first selector switch section and the first downconverting section, and a second downconverting section and a third downconverting section are provided between the second selector switch section and the A/D converters, wherein the amplifier and the second downconverting section are controlled on and off repetitively with the second period, while the third downconverting section is controlled on and off repetitively with the first period.

According to the present invention, the plurality of antennas for receiving the transmit signal reflected from the object are transmit/receive antennas for radiating the transmit signal, and the plurality of transmit/receive antennas are provided with first connecting means for connecting to the transmitter section and the receiver section in turn and with second connecting means and third connecting means for connecting to the transmitter section and the receiver section, respectively, so that the transmit signal is radiated and the reflected signal received when each of the antennas is connected by the first connecting means, wherein when each of the antennas is connected to the receiver section, the third connecting means turns on and off the connection with the receiver section.

According to the present invention, the first selector switch section has a configuration for selecting two adjacent antenna channels simultaneously and connecting the adjacent channels to the input terminal in alternating fashion, wherein, when performing processing in the digital signal processing section, phase correction is applied based on a phase relationship obtained with each of the adjacent channels acting as a reference channel.

In the radar apparatus of the present invention which sequentially connects the output terminals of the plurality of receiving antennas to the input terminal of the downconverter section by switching from one antenna to another, the effects that a low-frequency cut-off filter and a coupling capacitor inserted for low-frequency noise removal and AC signal amplification can have on signal components can be avoided by performing on-off control with the second period shorter than the first period with which the switching is performed.

When the on-off control function is included in the antenna switching means, cost reduction can be achieved since there is no need to provide an on-off control means separately.

Further, when the antenna switching means and/or the on-off control means are implemented by controlling amplifiers, the number of expensive RF components used can be reduced, achieving a cost reduction.

To extract the signal components, at least an equivalent number of signals are needed and, to apply digital filtering, sampling data of two or more times are needed. In the present invention, these requirements can be satisfied by performing sampling at intervals of the third period shorter than the second period.

On the other hand, to avoid the effects of the coupling capacitor and low-frequency cut-off filter, the on-off control must be performed at a frequency higher than the antenna switching frequency, and an on-off frequency at least twice as high will suffice for the purpose. In the present invention, as the on-off control is performed with the second period not longer than one half of the first period with which the antenna switching is performed, the effects of the coupling capacitor and low-frequency cut-off filter can b avoided.

In one preferred embodiment, the signal received by each receiving antenna is mixed with a local signal having the same frequency component as the transmit signal to obtain a first received signal, and the first received signal is further mixed with a local signal having a frequency component corresponding to the second period to produce a beat signal whose frequency is lower than the second frequency; as a result, the sampling frequency of the A/D converters, and hence the amount of data, can be reduced, which contributes to reducing the cost.

In another preferred embodiment, the first received signal obtained by mixing the signal received by each receiving antenna with a local signal having the same frequency component as the transmit signal is mixed with a local signal having a frequency component corresponding to the second period to produce a second beat signal, and the second beat signal is further mixed with a local signal having a frequency component corresponding to the first period to produce a beat signal of a lower frequency; as a result, the sampling frequency of the A/D converters, and hence the amount of data, can be further reduced, which contributes to further reducing the cost.

BRIEF DESCRIPTION OF THE DRAWINGS

FIG. 24 is a diagram showing an embodiment of a radar apparatus according to the present invention.

BEST MODE FOR CARRYING OUT THE INVENTION

Before describing the radar apparatus of the present invention, the principle of FM-CW radar and the principle of DBF radar will be described.

An FM-CW radar measures the distance to a target object, such as a vehicle traveling ahead, by transmitting a continuous wave frequency-modulated, for example, in a triangular pattern. More specifically, the transmitted wave from the radar is reflected by the vehicle ahead, and the reflected signal is received and mixed with the transmitted signal to produce a beat signal (radar signal). This beat signal is fast Fourier transformed to analyze the frequency. The frequency-analyzed beat signal exhibits a peak at which power becomes large in correspondence with the target. The frequency corresponding to this peak is called the peak frequency. The peak frequency carries information about distance, and the peak frequency differs between the rising portion and falling portion of the triangular FM-CW wave due to the Doppler effect associated with the relative velocity with respect to the vehicle ahead. The distance and relative velocity with respect to the vehicle ahead are obtained from the peak frequencies in the rising and falling portions. If there is more than one vehicle traveling ahead, a pair of peak frequencies in the rising and falling portions is generated for each vehicle. Forming pairs of peak frequencies in the rising and falling portions is called pairing.

Figure 1A:
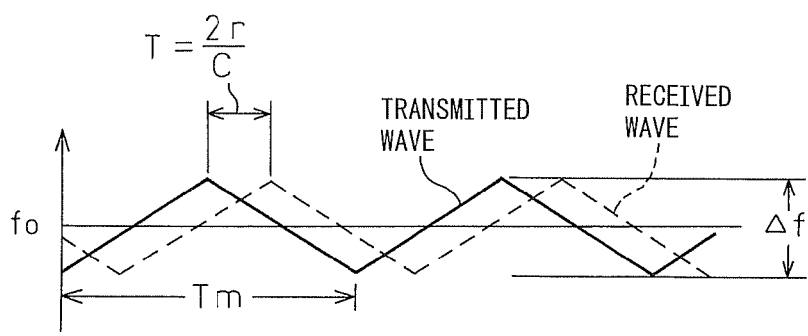
FIGS. 1A to 1C are diagrams for explaining the principle of FM-CW radar when the relative velocity with respect to target is 0.
Figure 1B:
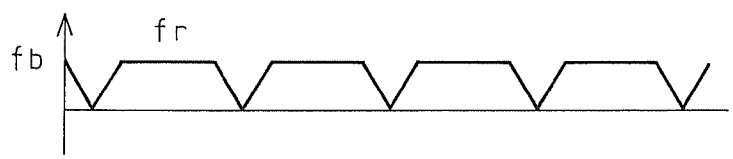
Figure 1C:
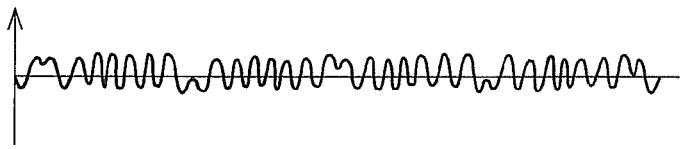

FIGS. 1A to 1C are diagrams for explaining the principle of the FM-CW radar when the relative velocity with respect to the target is 0. The transmitted wave is a triangular wave whose frequency changes as shown by a solid line in FIG. 1A. In the figure, f0 is the center frequency of the transmitted wave, $\Delta f$ is the FM modulation width, and Tm is the repetition period. The transmitted wave is reflected from the target and received by an antenna; the received wave is shown by a dashed line in FIG. 1A. The round trip time T to and from the target is given by T=2r/C, where r is the distance (range) to the target and C is the velocity of radio wave propagation.

Here, the received wave is shifted in frequency from the transmitted signal (i.e., produces a beat) according to the distance between the radar and the target.

The frequency component fb of the beat signal can be expressed by the following equation.

$$fb=fr=(4\cdot\Delta f/C\cdot Tm)r$$

where fr is the frequency due to the range (distance).

Figure 2A:
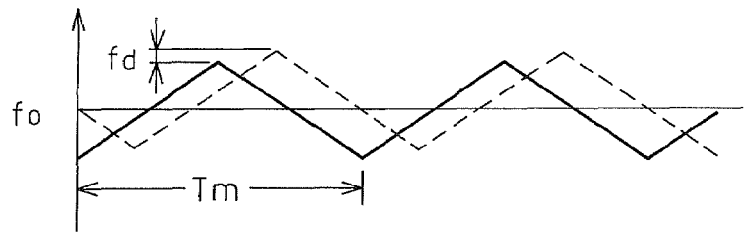
FIGS. 2A to 2C are diagrams for explaining the principle of FM-CW radar when the relative velocity with respect to target is v.
Figure 2B:
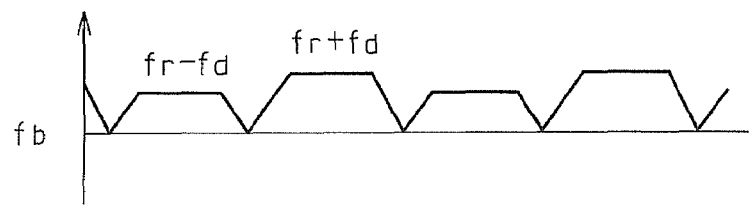
Figure 2C:
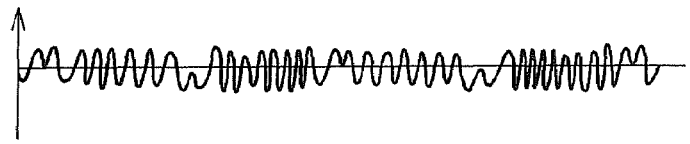

FIGS. 2A to 2C, on the other hand, are diagrams for explaining the principle of the FM-CW radar when the relative velocity with respect to the target is v. The frequency of the transmitted wave changes as shown by a solid line in FIG. 2A. The transmitted wave is reflected from the target and received by the antenna; the received wave is shown by a dashed line in FIG. 2A. Here, the received wave is shifted in frequency from the transmitted signal (i.e., produces a beat) according to the distance between the radar and the target. In this case, as the relative velocity with respect to the target is v, a Doppler shift occurs, and the beat frequency component fb can be expressed by the following equation.

$$fb=fr\pm fd=(4\cdot\Delta f/C\cdot Tm)r\pm(2\cdot f0/C)v$$

where fr is the frequency due to the distance, and fd is the frequency due to the velocity.

Figure 3:
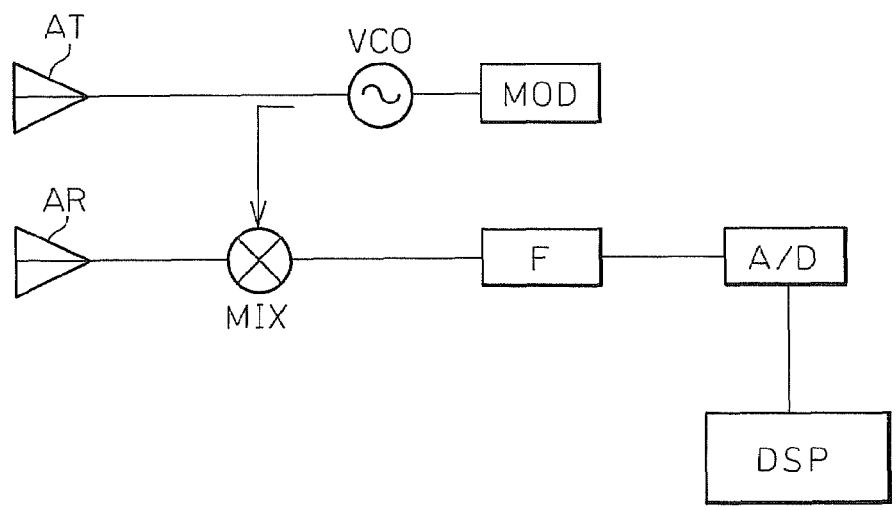
FIG. 3 is a diagram showing one configuration example of the FM-CW radar.

The symbols in the above equation have the following meanings.

fb: Transmit beat frequency
fr: Range (distance) frequency
fd: Velocity frequency
f0: Center frequency of transmitted wave
$\Delta f$: Frequency modulation width
Tm: Period of modulation wave
C: Velocity of light (velocity of radio wave)
T: Round trip time of radio wave to and from target object
r: Range (distance) to target object
v: Relative velocity with respect to target object FIG. 3 is a diagram showing one configuration example of the FM-CW radar. As shown, a modulating signal generator MOD applies a modulating signal to a voltage-controlled oscillator VCO for frequency modulation, and the frequency-modulated wave is transmitted out from a transmitting antenna AT, while a portion of the transmitted signal is separated and fed into a mixer MIX. The signal reflected from the target is received by a receiving antenna AR, and the received signal is mixed in the mixer MIX with the output signal of the voltage-controlled oscillator VCO to produce a beat signal. The beat signal is passed through a filter F, and is converted by an A/D converter into a digital signal; the digital signal is then supplied to a digital signal processor DSP where signal processing, such as a fast Fourier transform, is applied to the digital signal to obtain the distance and the relative velocity.

Digital beam forming (DBF) is a technology in which signals received by an array antenna constructed from a plurality of receiving antennas are each A/D converted and fed to a digital signal processing section and adjustments of beam scanning and sidelobe characteristics, etc. are made in the digital signal processing section.

Figure 4:
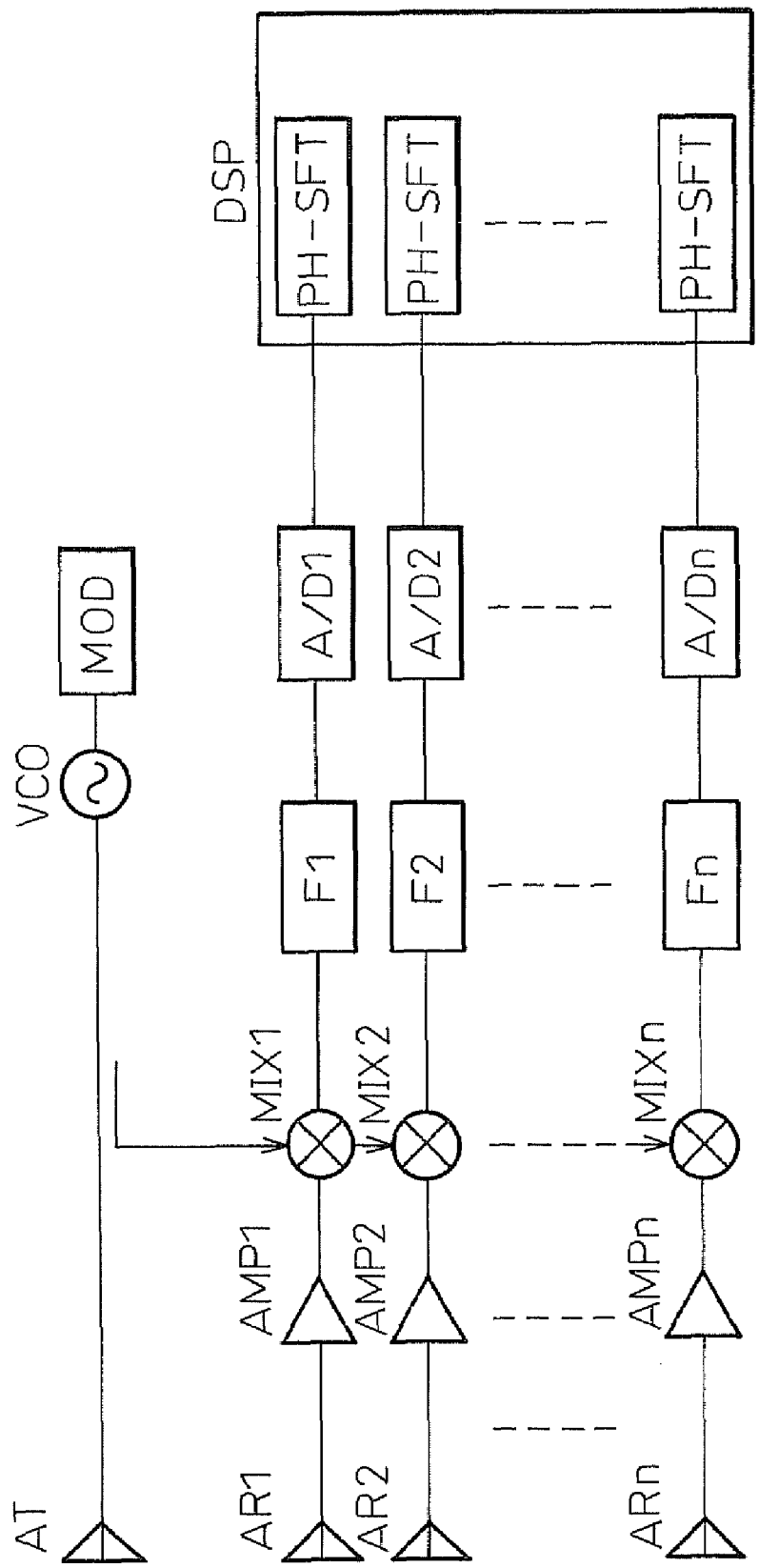
FIG. 4 is a diagram showing one configuration example of a digital beam forming (DBF) radar.

A DBF radar accomplishes the functions of the phase shifters of a phased-array antenna radar by digital signal processing; the basic configuration of the DBF radar is shown in FIG. 4.

As shown, a modulating signal generator MOD applies a modulating signal to a voltage-controlled oscillator VCO for frequency modulation, and the frequency-modulated wave is transmitted out from a transmitting antenna AT, while a portion of the transmitted signal is separated and fed into a plurality of mixers MIX1 to MIXn. Signals reflected from objects are received by a plurality of receiving antennas AR1 to ARn, and the received signals from the respective receiving antennas are fed via respective amplifiers AMP1 to AMPn into the respective mixers MIX1 to MIXn where the received signals are each mixed with the output signal of the voltage-controlled oscillator VCO to produce beat signals.

The beat signals thus produced are passed through respective filters F1 to Fn and are converted by respective A/D converters A/D1 to A/Dn into digital signals which are supplied to a digital signal processor DSP. In the DSP, phase shifting (PH-SFT) is applied to the digital signal from each channel, and all the channels are combined.

The feature of DBF is that a plurality of beams can be formed in a single acquisition process because, once the signals from all the receiving antennas are taken in as digital signals, the beams can be synthesized in any desired directions based on the digital signals.

Figure 5:
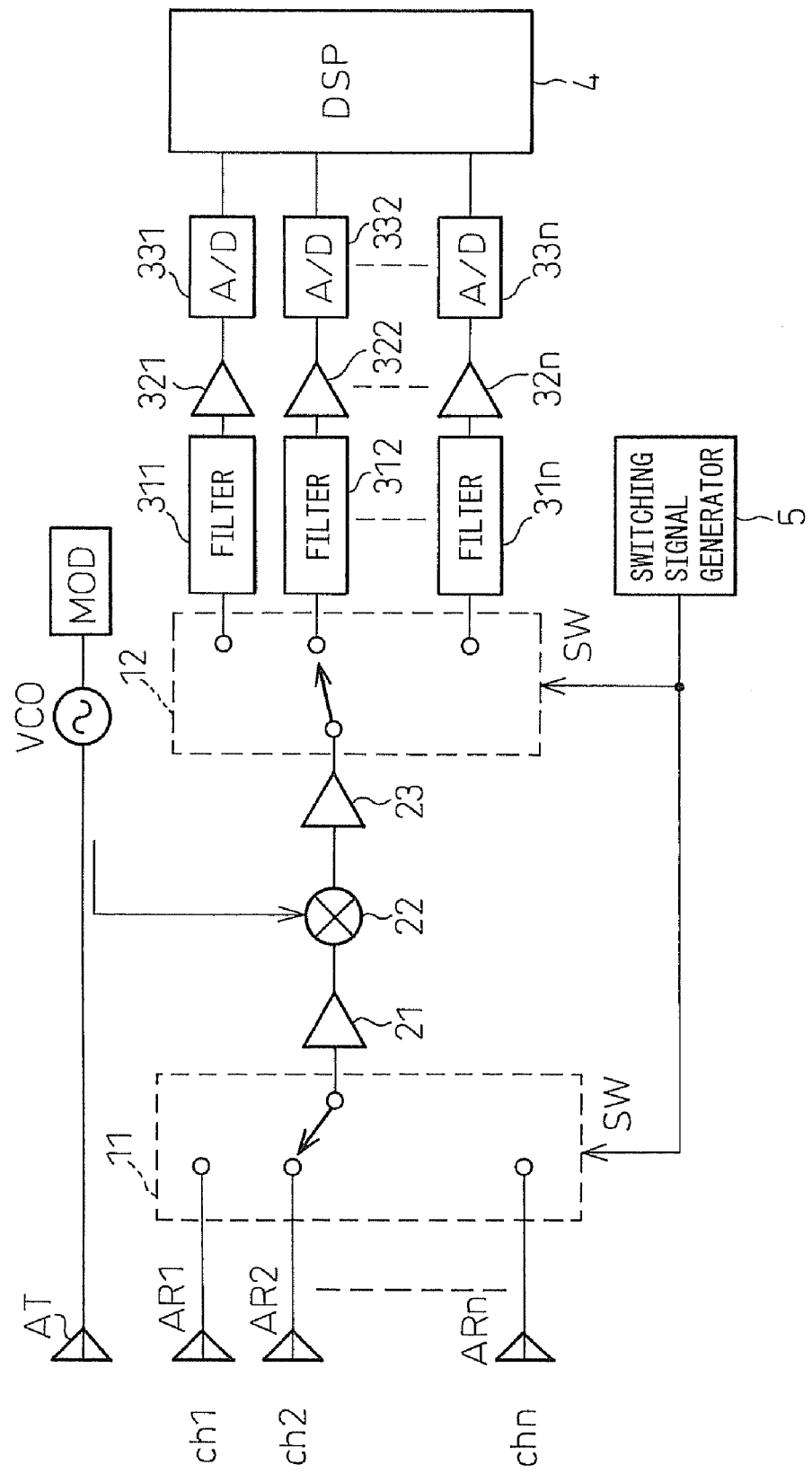
FIG. 5 is a diagram showing the configuration of a radar apparatus to which the present invention is applied.

FIG. 5 is a diagram showing the configuration of a radar apparatus to which the present invention is applied. The radar apparatus shown here is an FM-CW radar apparatus constructed by applying the principle of DBF.

As shown, a modulating signal generator MOD applies a modulating signal to a voltage-controlled oscillator VCO for frequency modulation, and the frequency-modulated wave is transmitted out from a transmitting antenna AT, while a portion of the transmitted signal is separated and fed into a mixer 22 which acts as a downconverter. Signals reflected from objects are received as received signals by a plurality of receiving antennas AR1 to ARn. Here, the signal paths of the receiving antennas AR1 to ARn are designated as channels ch1 to chn, respectively. Reference numeral 11 is a first selector switch section which sequentially selects the output terminals of the plurality of receiving antennas one at a time for connection to the input terminal of the downconverter via an amplifier 21, thereby switching the signal path to be connected to the downconverter between the channels ch1 to chn (hereinafter referred to as the "switching operation").

Figure 6:
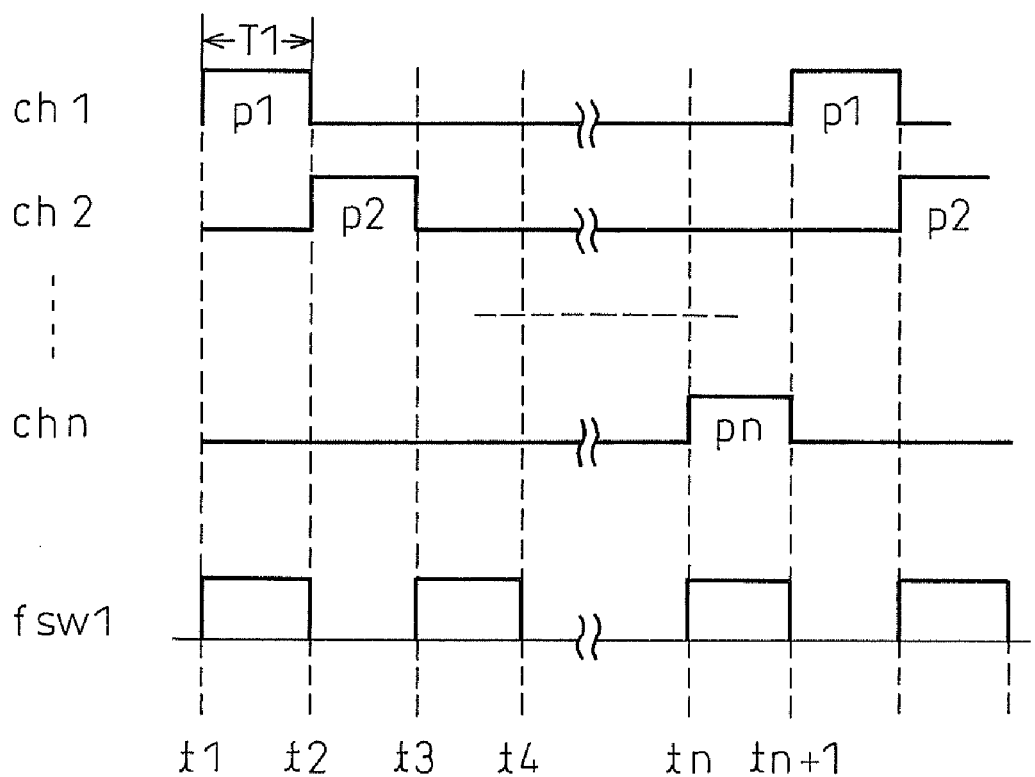
FIG. 6 is a diagram showing a signal output from a switching signal generator and a waveform for explaining antenna switching operation.

This switching operation is performed under the control of a signal output from a switching signal generator 5. As shown in FIG. 6, this switching signal is a clock signal of frequency fsw1 (first frequency) and, as shown by p1 to pn on ch1 to chn, channel switching occurs at both the rising and falling edges of the switching signal of the frequency fsw1. As a result, during p1 (time t1 to t2), ch1 is connected to the amplifier 21, and during p2 (time t2 to t3), ch2 is connected to the amplifier 21; in like manner, during pn (time tn to tn+1), chn is connected to the amplifier 21. The duration of each of p1 to pn is the same, and the channel is switched from one to another at intervals of period T1 (hereinafter referred to as the "first period"), as shown in FIG. 6.

Figure 7:
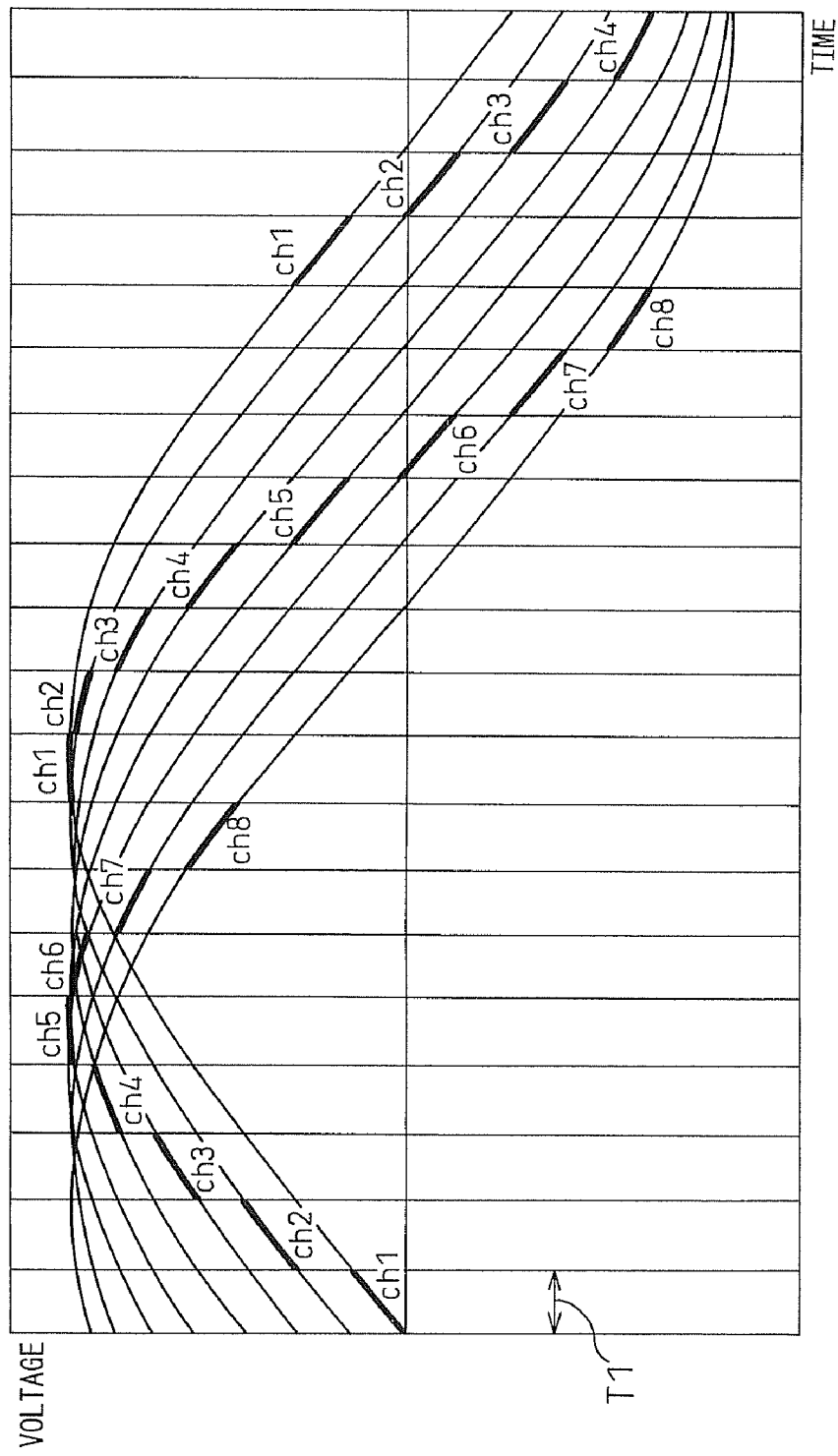
FIG. 7 is a diagram showing the waveforms of downconverted signals.

Each signal amplified by the amplifier 21 is fed into the mixer 22, the downconverter, where the signal is mixed with the signal output from the voltage-controlled oscillator VCO and is thus downconverted to produce a beat signal. The waveforms of the downconverted signals are shown in FIG. 7. In FIG. 7, the time is plotted along the abscissa and the voltage along the ordinate. Vertical lines are drawn with a spacing equal to the channel switching period T1 (first period) with which the selector switch performs switching. The figure shows the case where the number of receive channels n=8; as shown, the phases of the beat signals received from the respective channels ch1 to ch8 are progressively shifted by a small amount. The eight curves show the beat signals produced by downconverting the signals received on the respective channels. In the illustrated configuration, as the channel switching is performed with the first period based on the signal output from the switching signal generator 5, the beat signals output from the mixer 22 have the waveforms shown by thick lines in FIG. 7. Each beat signal is amplified by an amplifier 23 and supplied to a second selector switch section 12. With the switching operation of the second selector switch section 12, the output of the amplifier 23 is sequentially connected to a selected one of a plurality of channels each having a filter (311-31n), an amplifier (321-32n), and an A/D converter (331-33n). This switching operation is performed under the control of the signal from the switching signal generator 5, and the connection is switched with the first period in a manner synchronized to the antenna switching operation of the first selector switch section 11.

The filters are connected to the respective A/D converters (331 to 33n) via the respective amplifiers (321 to 32n), and the signal passed through each filter (311-31n) is converted by a corresponding one of the A/D converters (331 to 33n) into a digital signal which is supplied to a digital signal processor DSP 4. In the DSP, signal processing such a fast Fourier transform is applied and phase shifting performed on the digital signal from each channel, and all the channels are combined, to measure the distance and the relative velocity.

In the configuration shown in FIG. 5, the number of filters has been made equal to n, i.e., the number of antennas, but the number of filters may be made smaller than the number of antennas. However, there must be at least as many filters as there are antennas that need to be switched simultaneously. For example, if the number of antennas that are switched synchronously is two, then two filters may suffice for the purpose.

Figure 8:
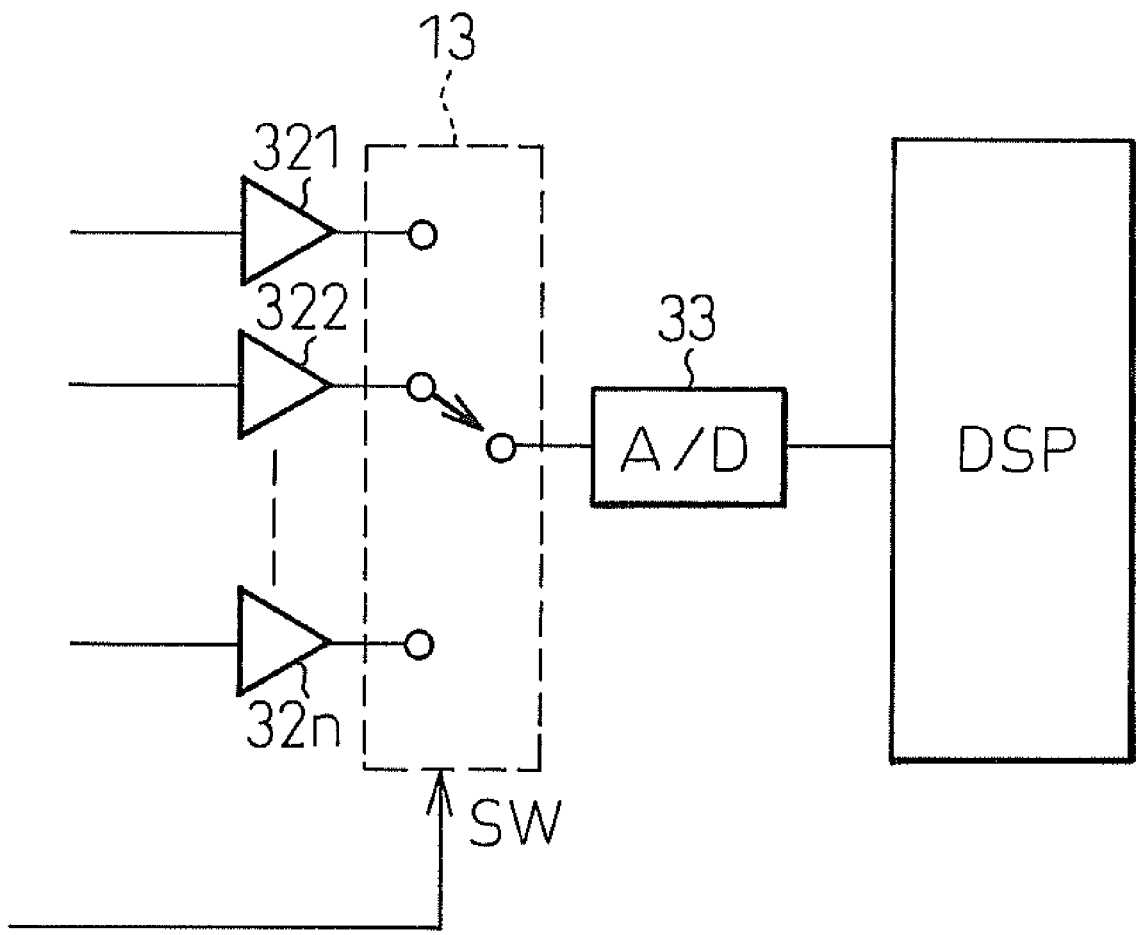
FIG. 8 is a diagram showing a configuration where the number of A/D converters is reduced to one.

Further, in FIG. 5, more than one A/D converter has been provided but, as shown in FIG. 8, the number of A/D converters may be reduced to one, with provisions made to switch the connection by a selector switch 13. In this case, the switching operation of the switch is performed under the control of the signal from the switching signal generator 5 in a manner synchronized to the antenna switching operation.

In the above configuration, the filters (311 to 31n) are inserted in the respective channels to enhance the S/N ratio, suppress the dynamic range, or suppress the FM/AM noise ratio. Then, to prevent the signals from interfering with each other due to the filters, the selector switch section 12 is provided in order to separate the signal for each channel.

Figure 9:
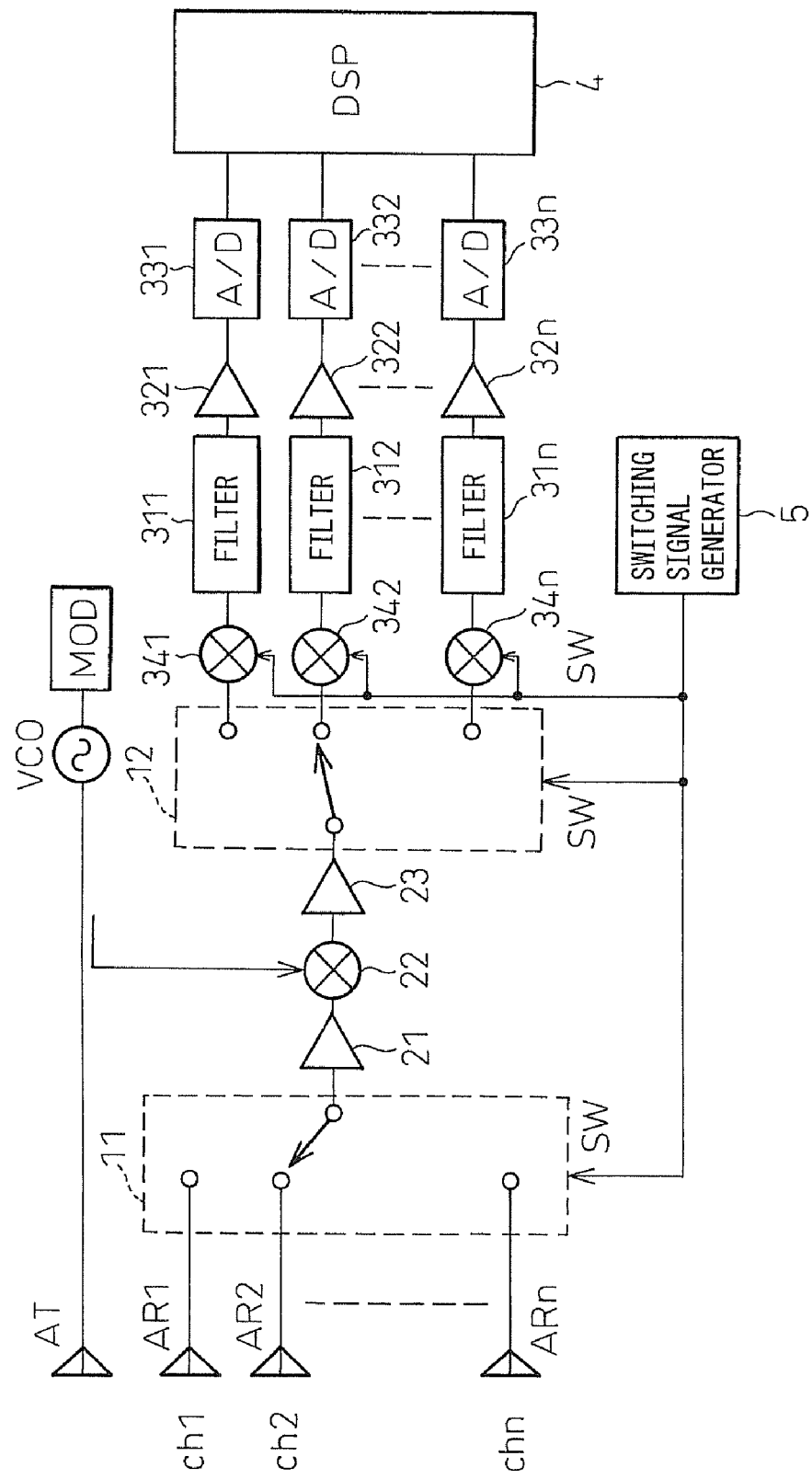
FIG. 9 is a diagram showing a modified example of the radar apparatus shown in FIG. 5.

FIG. 9 shows a modification of the radar apparatus shown in FIG. 5. The difference from the radar apparatus shown in FIG. 5 is that mixers (341 to 34n) as second downconverters are inserted before the respective filters (311 to 31n) and controlled on and off by the switching signal output from the switching signal generator 5. That is, the signal from the second selector switch section 12 is sequentially coupled to a selected one of the mixers (341 to 34n) acting as the downconverters on the respective channels and, thus, the signal is downconverted a second time by controlling the second downconverter on and off by the clock signal of frequency fsw1 output from the switching signal generator 5 as shown in FIG. 6.

In this modified example, as the mixers (341 to 34n) are inserted before the respective filters (311 to 31n), and the signal to be input via the second selector switch section is downconverted before being input to the respective filters, the S/N ratio improves and the signal can be extracted efficiently.

Embodiment 1

Figure 10:
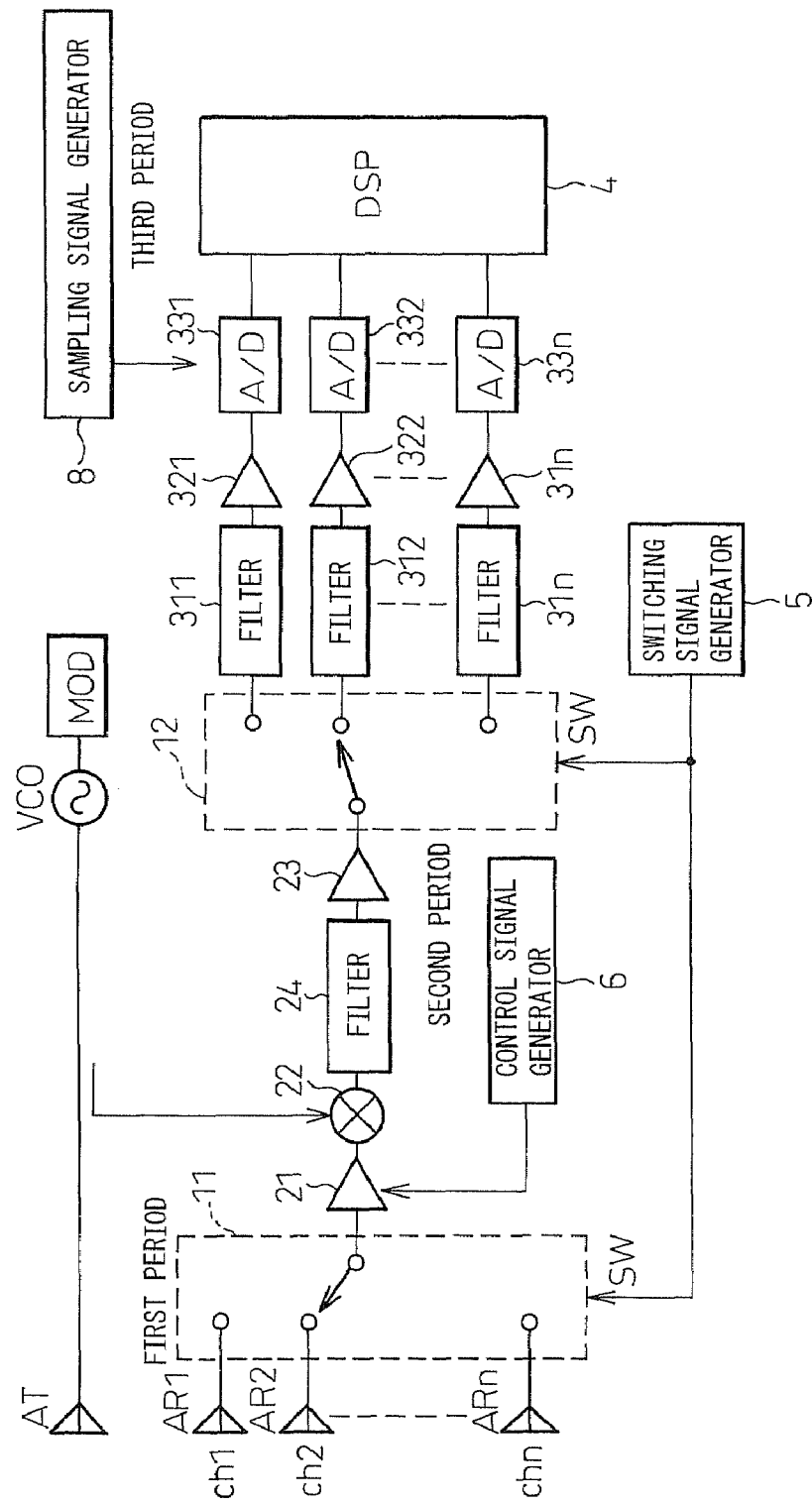
FIG. 10 is a diagram showing a first embodiment of a radar apparatus according to the present invention.

FIG. 10 is a diagram showing a first embodiment of a radar apparatus according to the present invention. The radar apparatus shown here differs from the radar apparatus shown in FIG. 5 in that the mixer 22 is followed by a filter 24, and in that the amplifier 21 is controlled on and off by a signal applied from a control signal generator 6. The filter 24 here is provided to cut off the DC component and, to avoid the effects of this filter, the amplifier 21 is controlled on and off by the signal from the control signal generator 6.

In the configuration shown in FIG. 10, the amplifier is used as the on-off controller for controlling each channel signal on and off, but it will be appreciated that any other device having a similar function can be used as the on-off controller.

Figure 11:
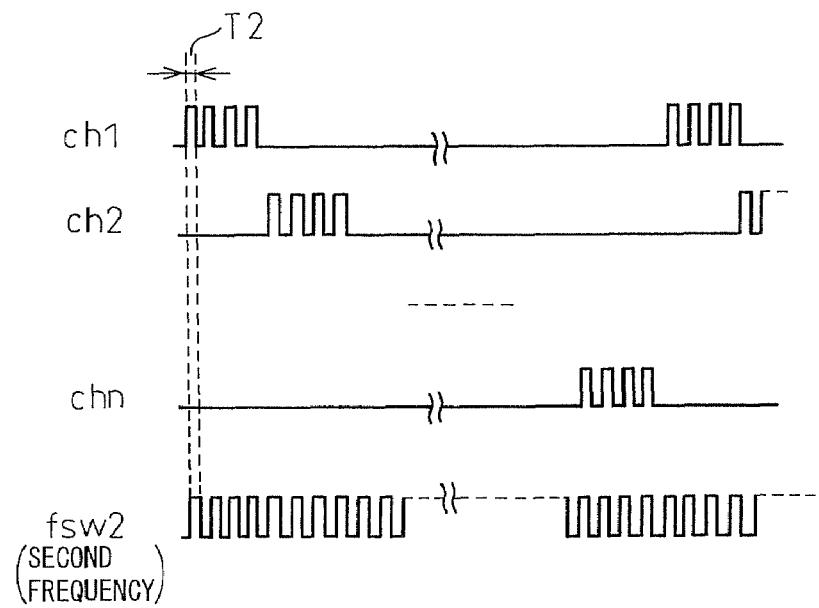
FIG. 11 is a diagram showing a signal output from a control signal generator and a waveform for explaining on-off control operation.

FIG. 11 shows the waveform of the signal output from the control signal generator 6. This signal is a clock signal having a frequency fsw2 (second frequency) higher than fsw1 (first frequency). Accordingly, the period T2 (hereinafter referred to as the "second period") with which the amplifier is controlled on and off by this signal is shorter than the first period (T1).

The signal input to the amplifier 21 from a selected one of the channels ch1, ch2, ..., chn is controlled on and off by the clock signal output from the control signal generator as shown in FIG. 11. As a result, the received signal, input from each channel to the amplifier 21 via the selector switch section 11, is controlled on and off in the amplifier 21 by the clock signal of the period T2 (second period) shown in FIG. 11.

The second period T2 is chosen to be shorter than or equal to one half of the first period T1. The reason is that, by setting T2 shorter than or equal to one half of the period T1 with which the selector switch section 11 performs switching, the signal can be controlled on and off at least once during T1.

Figure 12:
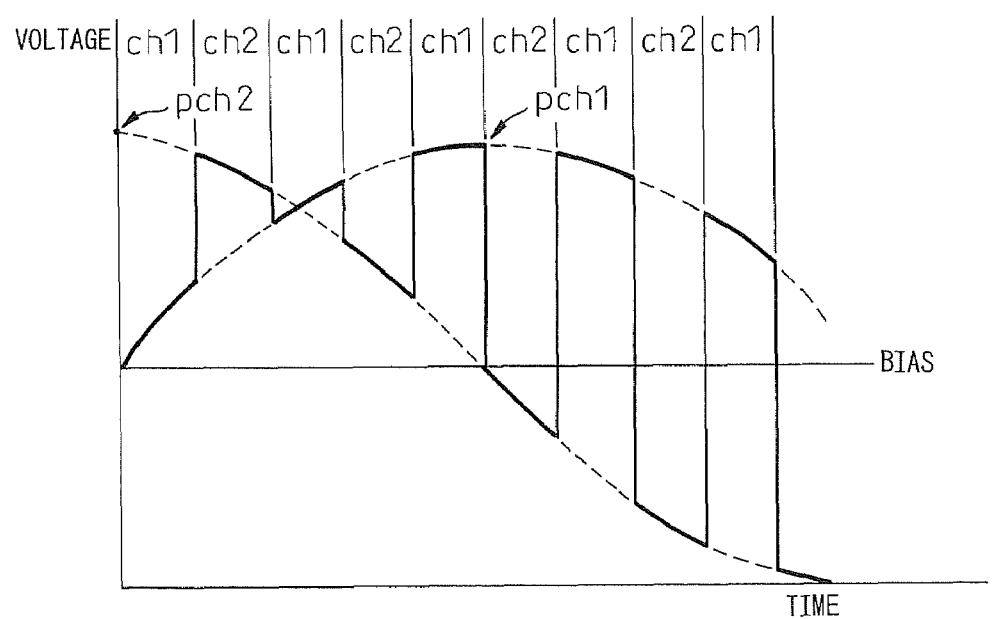
FIG. 12 is a diagram showing the waveforms of signals input to a filter 24 in the radar apparatus shown in FIG. 10.

Next, the operation of the first embodiment shown in FIG. 10 will be described. In the first embodiment, the mixer 22 is followed by the low-frequency cut-off filter 24 to cut off the DC component. FIG. 12 is a graph showing input waveforms to the filter 24 in FIG. 10. In the graph, the time is plotted along the abscissa and the voltage along the ordinate. The input waveforms are the same as the waveforms of the downconverted signals shown in FIG. 7 but, for convenience of explanation, FIG. 12 shows the case where the number of receiving channels is 2, and the two curves show the beat signals produced by downconverting the signals received on the respective channels. In this case, as the channel switching is performed with the first period based on the signal output from the switching signal generator 5, the beat signals output from the mixer 22 have the waveforms shown by thick lines in FIG. 12.

Figure 13:
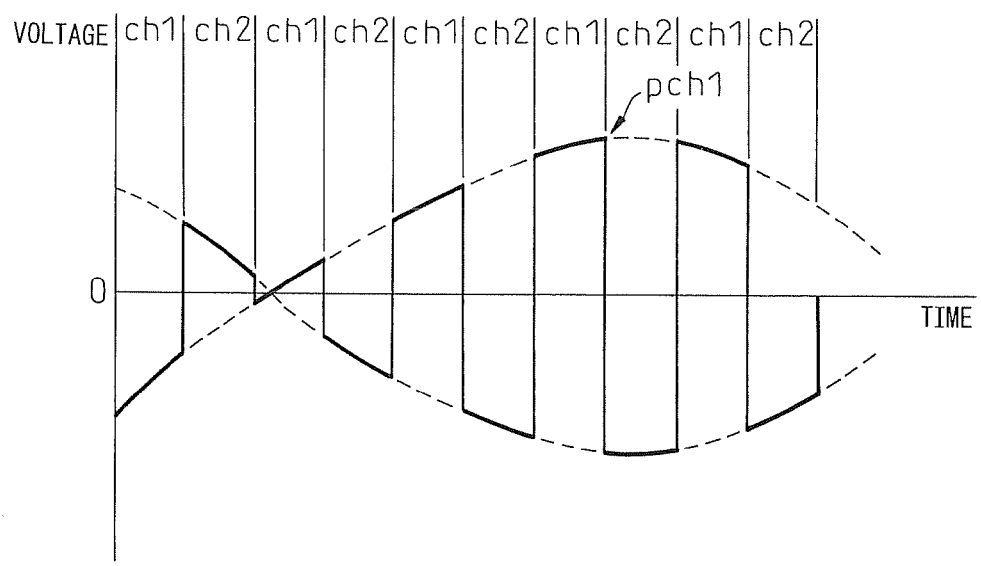
FIG. 13 is a diagram showing the waveforms of signals output from the filter 24 in the radar apparatus shown in FIG. 10.

FIG. 13 is a graph showing output waveforms from the filter 24 in FIG. 10. The waveforms are produced by cutting off the DC component from the waveforms input to the filter 24 but, as the signal components of the channels 1 and 2 are mixed with each other at the time of channel switching, the phase of each channel is shifted and, as a result, the peak of the waveform of each channel is shifted, resulting in an inability to accurately measure the distance, etc. For example, the peak position pch1 of the channel 1 in FIG. 12 is shifted to the peak position pch1 in FIG. 13.

In the present invention, to prevent such shifts from occurring, the signal input from each of the channels ch1, ch2, . . . , chn is controlled on and off by the clock signal output from the control signal generator as shown in FIG. 11. In the first embodiment shown in FIG. 10, the signal input from each of the channels ch1, ch2, . . . , chn is controlled on and off by controlling the amplifier 21 on and off by the signal applied from the control signal generator 6.

Figure 14:
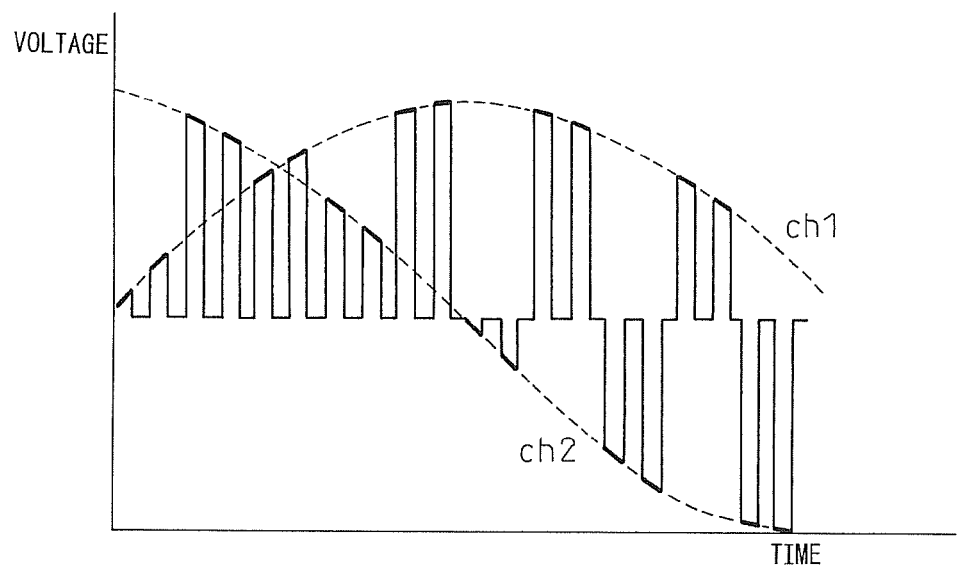
FIG. 14 is a diagram showing the waveforms of the signals input to the filter 24 when the signal from each channel is controlled on and off.

FIG. 14 shows the waveforms of the on-off controlled channel signals downconverted by the mixer 22. In the first embodiment shown in FIG. 10, these signal waveforms are input to the filter 24. Here also, the waveforms for the case of two receiving channels are shown for convenience of explanation.

Figures 15A, 15B:
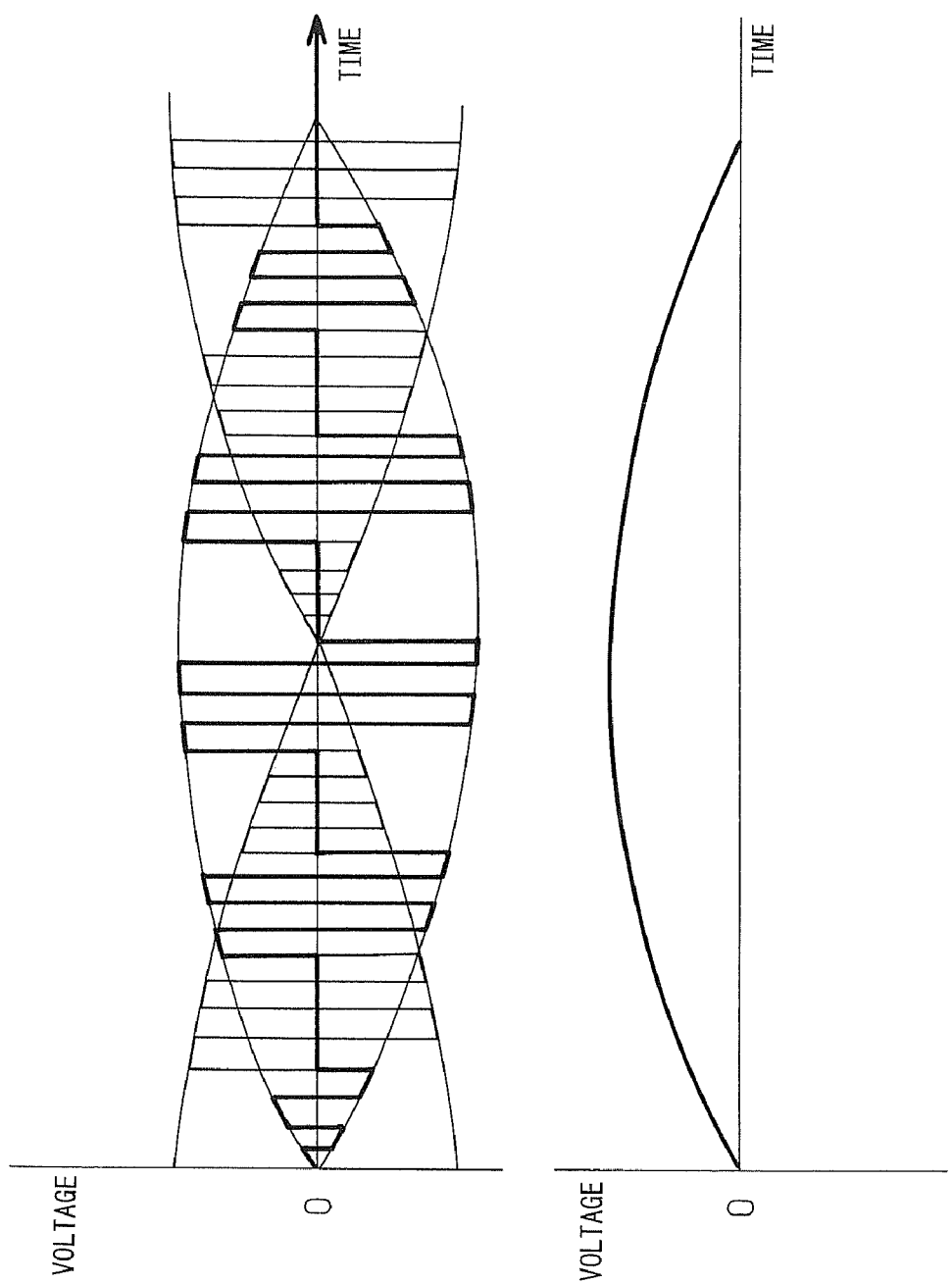
FIGS. 15A and 15B are diagrams showing the waveforms of the signals (channel 1) output from the filter 24 when the signal from each channel is controlled on and off.

FIGS. 15A and 15B show the output waveforms of the filter 24 when the waveforms shown in FIG. 14 are input. In FIG. 15A, the waveform shown by a thick line is the waveform of the channel 1; as shown in FIG. 15B, no shifting occurs in peak value compared with the input waveform of the filter.

Figures 16A, 16B:
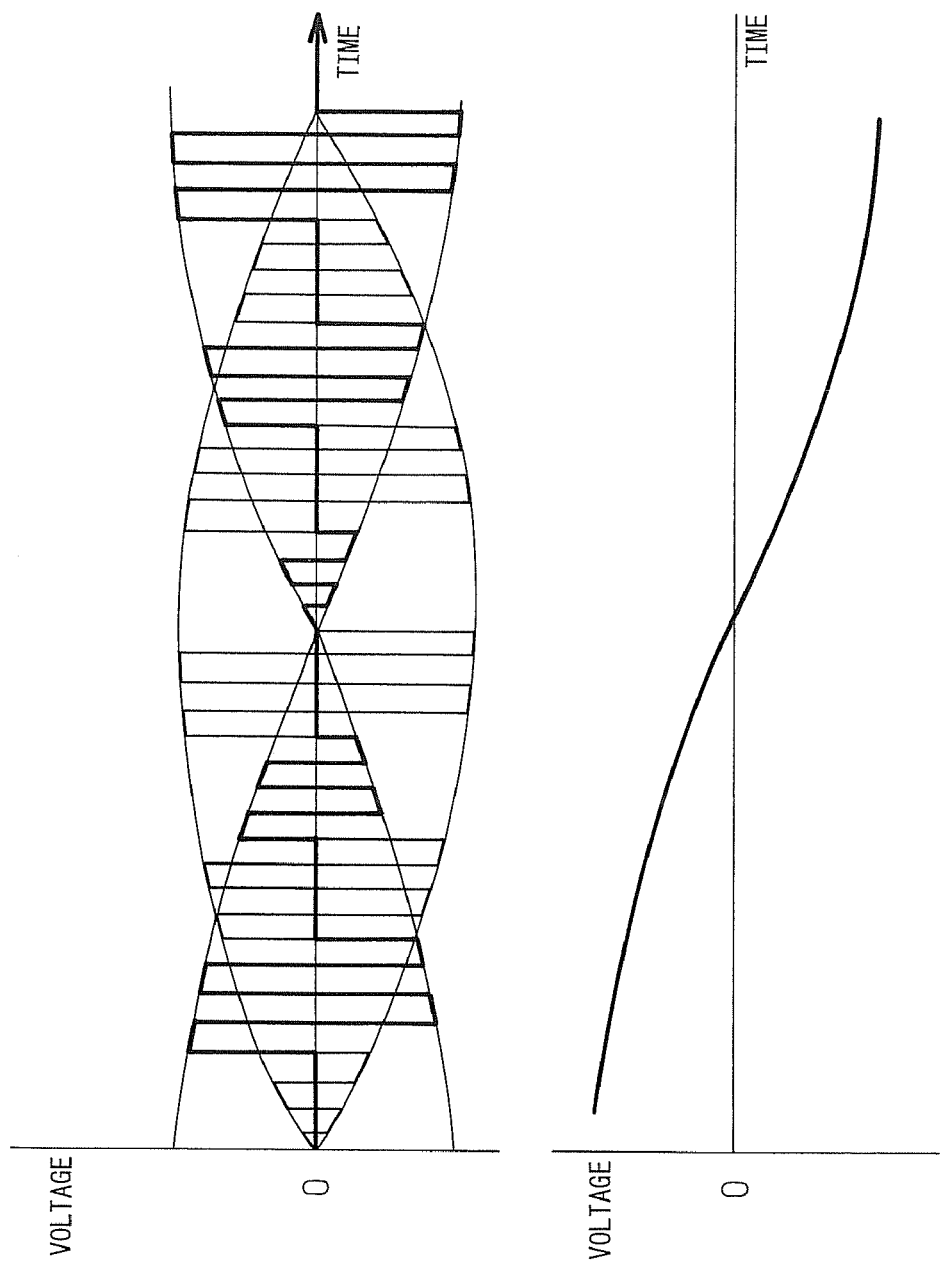
FIGS. 16A and 16B are diagrams showing the waveforms of the signals (channel 2) output from the filter 24 when the signal from each channel is controlled on and off.

Likewise, FIGS. 16A and 16B show the output waveforms of the filter 24 when the waveforms shown in FIG. 14 are input. In FIG. 16A, the waveform shown by a thick line is the waveform of the channel 2; as shown in FIG. 16B, no shifting occurs in peak value compared with the input waveform of the filter.

In the embodiment of FIG. 10, sampling may be performed by applying a signal to the A/D converters 331 to 33$n$ from a sampling signal generator 8. The period of the signal to be output from the sampling signal generator 8 (hereinafter referred to as the "third period") is set shorter than the second period. By performing sampling at the A/D conversion stage, the S/N ratio improves, and the cost can be reduced by reducing the number of components.

Figure 19:
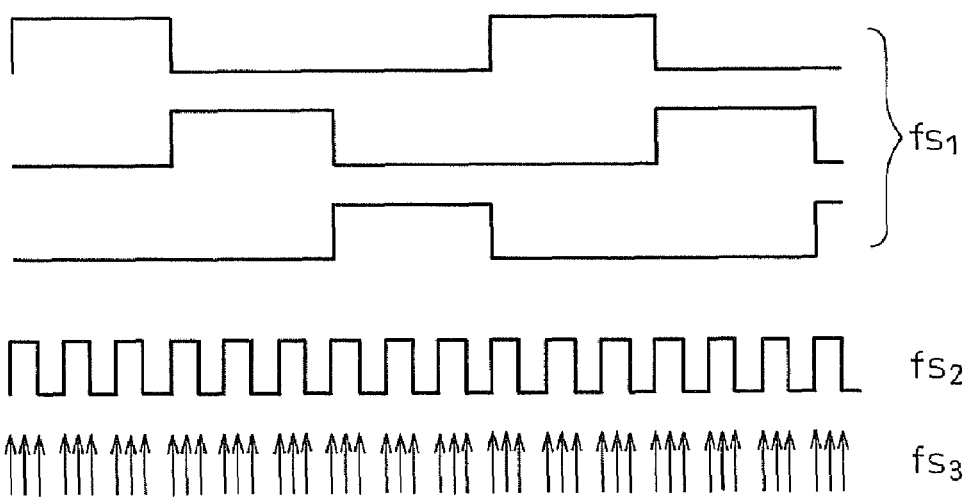
FIG. 19 is a diagram showing the waveform of a signal that is output to A/D converters from a sampling signal generator.

FIG. 19 is a diagram showing the waveform of the signal that is output to the A/D converters 331 to 33$n$ from the sampling signal generator 8. This signal is a clock signal having a frequency fsw3 (third frequency) higher than fsw2 (second frequency). Accordingly, the period T3 (hereinafter referred to as the "third period") with which the A/D converters are turned on and off by this signal is shorter than the second period T2.

Embodiment 2

Figure 17:
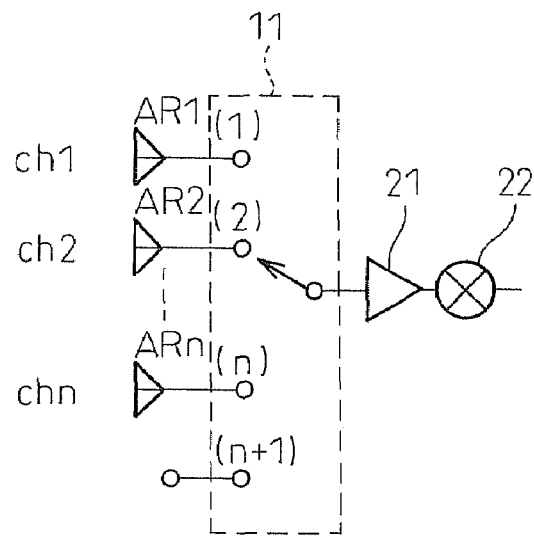
FIG. 17 is a diagram showing a configuration where a first selector switch section 1 is provided with two functions.

FIG. 17 is a diagram showing the configuration in which the selector switch section 11 is provided with two functions in the embodiment of the radar apparatus of the present invention shown in FIG. 10.

In FIG. 10, the selector switch section 11 is controlled by the signal from the switching signal generator shown in FIG. 6 so that the channel to be connected to the amplifier 21 is switched from one to another at intervals of the first period T1 (the first function), while the amplifier 21 is controlled on and off by the pulse signal of the second period T2 shown in FIG. 11 (the second function). The switch section 11 shown in FIG. 11 is configured to perform not only the first function but also the second function.

As shown in FIG. 17, the switch section 11 has an (n+1)th terminal, a dummy terminal, connected to none of the antennas, in addition to the terminals (1, 2, . . . , n) at which the signals received by the respective antennas AR1, AR2, . . . , ARn are output. With the provision of this dummy terminal, the signal input to the amplifier 21 from each of the channels ch1, ch2, . . . , chn shown in FIG. 11 can be controlled on and off by the switch section 11 alone.

An explanation will be given by taking as an example the case where the switch SW in the selector switch section 11 is connected to the ch2 terminal (2) as shown in FIG. 17. In the first period T1, the terminal (2) is connected to the amplifier 21. During that time, the switch SW is switched between the terminals (2) and (n+1) repetitively with the second period T2. That is, during that time, the switch SW is switched from (2) to (n+1) to (2) to (n+1) to (2) . . . (n+1) to (2). When the switch SW is connected to the terminal (2), the received signal on ch2 is input to the amplifier 21, but when the switch SW is connected to the terminal (n+1), the received signal on ch2 is not input to the amplifier 21 because the terminal (2) is not connected to the amplifier 21. In this way, the signal output from each channel is not only switched for connection but also controlled on and off by the selector switch section 11.

Embodiment 3

Figure 18:
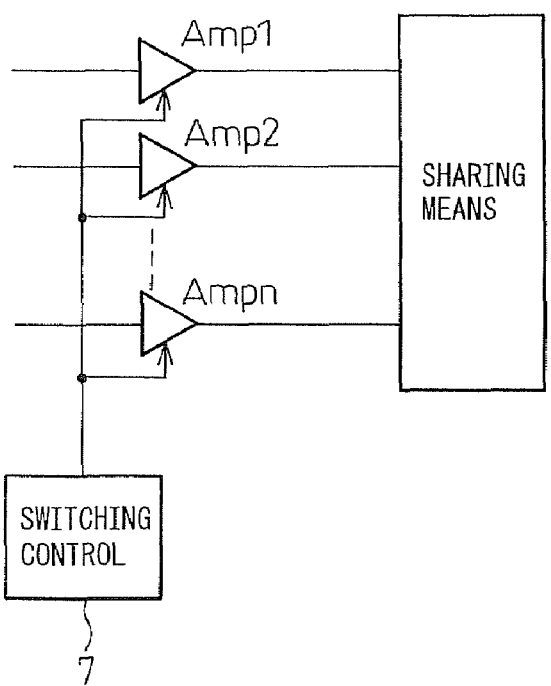
FIG. 18 is a diagram for explaining the operation in the radar apparatus of the present invention when the first selector switch section is replaced by amplifiers.

FIG. 18 is a diagram showing the configuration in which the antenna switching operation and the on-off control performed in the switch section are performed using amplifiers. According to this embodiment, the first selector switch section 11 is constructed from amplifiers Amp1 to Ampn connected to the output terminals of the respective antennas; then, the antenna switching operation is performed by controlling the amplifiers Amp1 to Ampn by the signal from the switching signal generator 5, and the amplifier connected to the selected antenna is controlled on and off by the signal from the control signal generator 6. For example, when the amplifier Amp1 is ON, the other amplifiers Amp2 to Ampn are held OFF, and at the same time, the amplifier Amp1 is controlled on and off repetitively with the period shown in FIG. 11.

Embodiment 4

Figure 20:
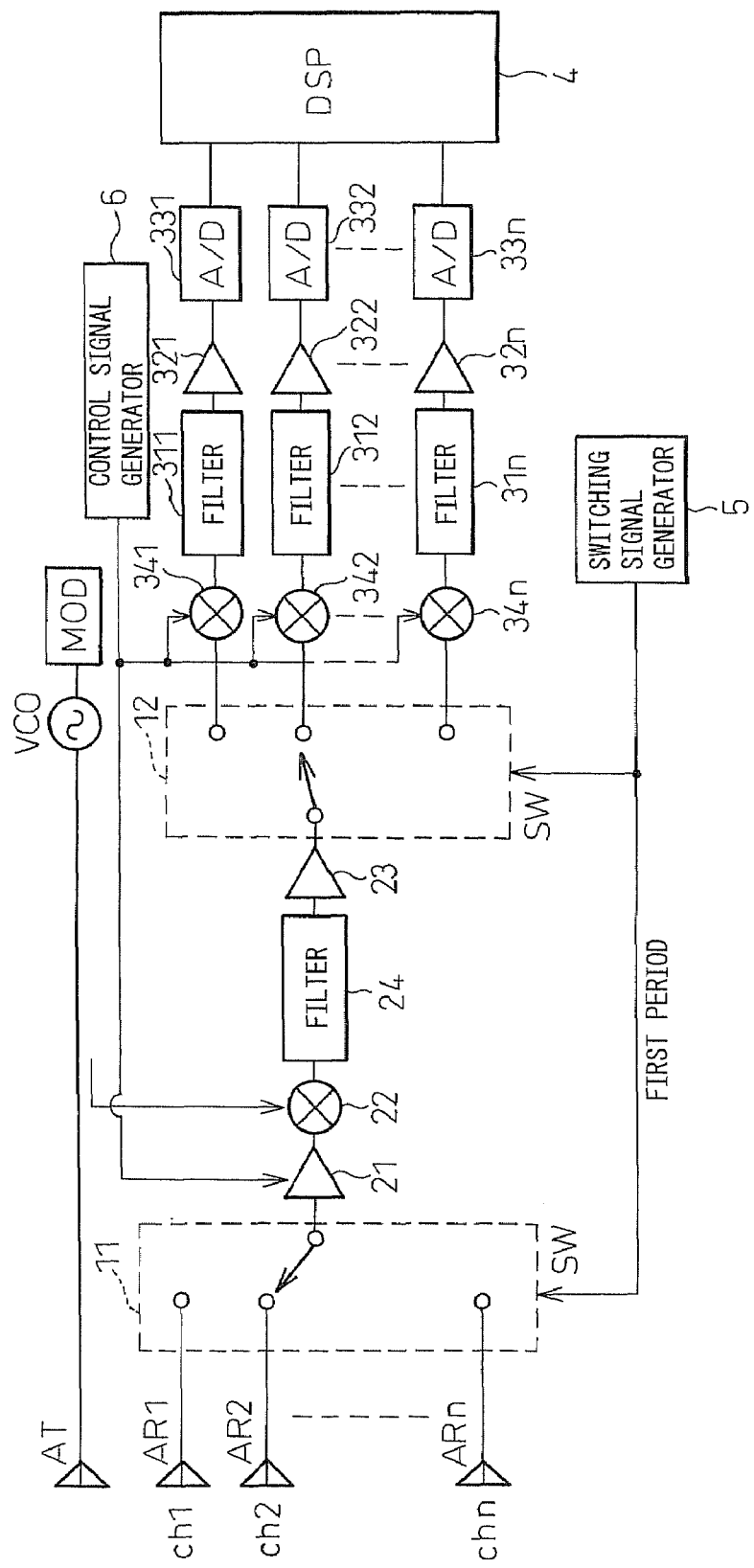
FIG. 20 is a diagram showing an embodiment of a radar apparatus according to the present invention.

FIG. 20 is a diagram showing a fourth embodiment of a radar apparatus according to the present invention. The radar apparatus shown here differs from the radar apparatus shown in FIG. 10 in that mixers (341 to 34n) as second downconverters are inserted before the filters (311 to 31n) on the respective channels and in that the amplifier 21 and the mixers (341 to 34n) are controlled on and off with the second period T2 by the signal applied from the control signal generator 6.

By thus lowering the signal frequency range by downconverting, the A/D conversion speed can be reduced, and the memory capacity can also reduced, serving to reduce the cost.

Embodiment 5

Figure 21:
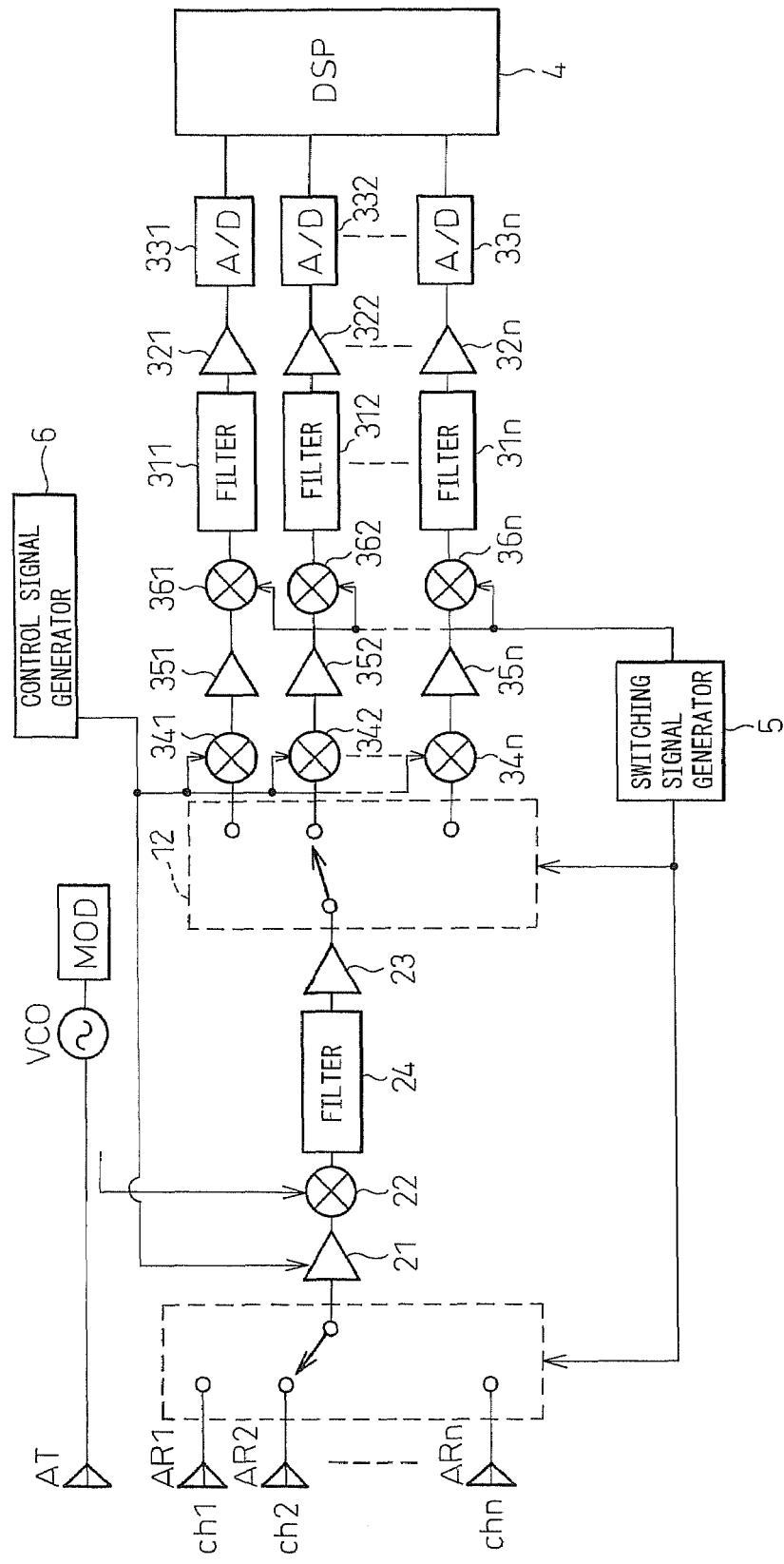
FIG. 21 is a diagram showing an embodiment of a radar apparatus according to the present invention.

FIG. 21 is a diagram showing a fifth embodiment of a radar apparatus according to the present invention. The radar apparatus shown here differs from the radar apparatus shown in FIG. 10 in that mixers (341 to 34n) as second downconverters, amplifiers (351 to 35n), and mixers (361 to 36n) as third downconverters are inserted before the filters on the respective channels. Then, the amplifier 21 and the mixers (341 to 34n) are controlled on and off with the second period T2 by the signal applied from the control signal generator 6, while the mixers (361 to 36n) as the third downconverters are controlled on and off with the first period T1 by the signal applied from the switching signal generator 5.

In this case also, as in the first embodiment, by lowering the signal frequency range by downconverting, the A/D conversion speed can be reduced, and the memory capacity can also reduced, serving to reduce the cost.

Embodiment 6

Figure 22:
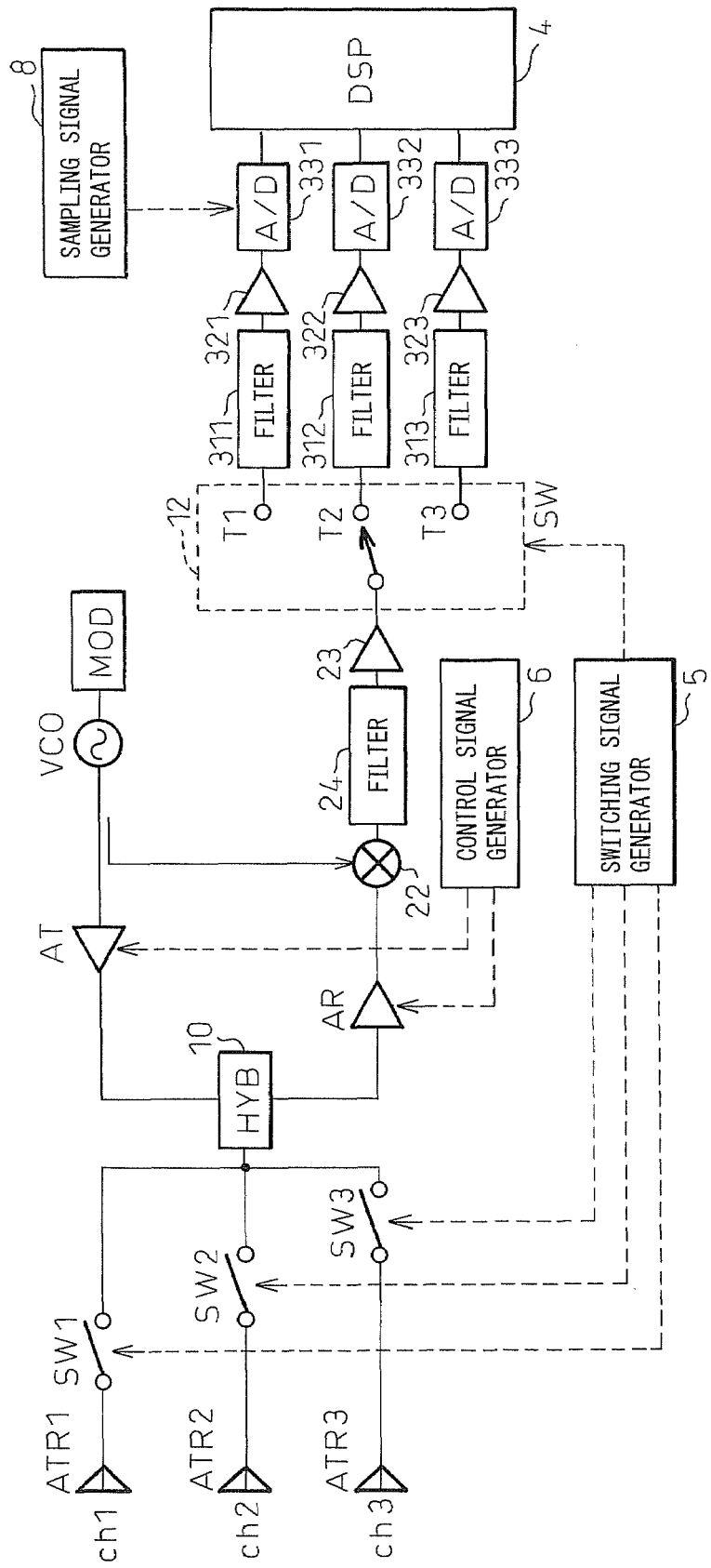
FIG. 22 is a diagram showing an embodiment of a radar apparatus according to the present invention.

FIG. 22 is a diagram showing a sixth embodiment of a radar apparatus according to the present invention. This embodiment is a modification of the first embodiment shown in FIG. 10, and differs from the first embodiment in that the plurality of antennas are used for both transmission and reception and alternately switched between transmission and reception.

FIG. 22 shows the case where the number of transmit/receive antennas is 3, and the channel 1 (ch1) comprises transmitter amplifier AT, transmit/receive antenna ATR1, switch SW1, hybrid 10, receiver amplifier AR, mixer 22, filter 24, amplifier 23, terminal T1 of second selector switch section 12, filter 311, amplifier 321, A/D converter 331, and DSP 4.

Likewise, the channel 2 (ch2) comprises transmitter amplifier AT, transmit/receive antenna ATR2, switch SW2, hybrid 10, receiver amplifier AR, mixer 22, filter 24, amplifier 23, terminal T2 of second selector switch section 12, filter 312, amplifier 322, A/D converter 332, and DSP 4. The channel 3 (ch3) also has a similar configuration.

The switches SW1, SW2, and SW3 are sequentially turned on by the signal from the switching signal generator 5, and transmission/reception is performed in the order of channel 1, channel 2, and channel 3. The switching signal generator 5 also sends a signal to the second selector switch section 12, causing the switch to connect to the terminals T1, T2, and T3 sequentially in this order as the switches SW1, SW2, and SW3 are sequentially turned on.

AT designates the amplifier in the transmitter and AR the amplifier in the receiver, and the amplifiers are alternately switched on and off by the signal from the control signal generator 6 in such a manner that AT is ON and AR is OFF during the transmitting period, while AR is ON and AT is OFF during the receiving period.

Figure 23:
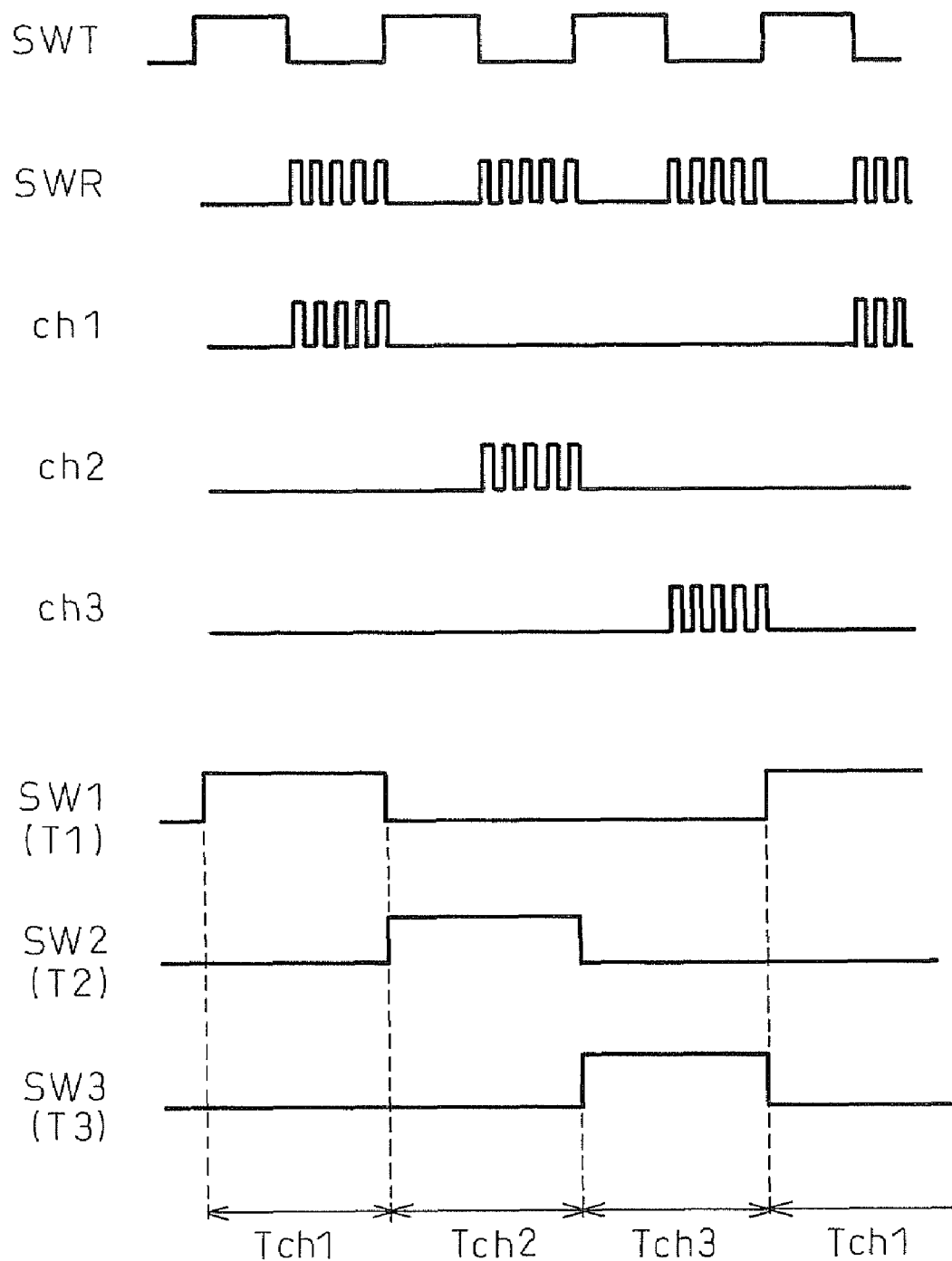
FIG. 23 is a waveform diagram for explaining the operation of the radar apparatus shown in FIG. 22.

FIG. 23 is a waveform diagram showing how SW1, SW2, and SW3 operate with the signal from the switching signal generator 5 and how the amplifiers AT and AR operate with the signal from the control signal generator 6.

In FIG. 23, the waveform of SW1 shows the period during which SW1 is ON and, synchronously with it, the second selector switch section 12 is connected to the contact T1, the waveform of SW2 shows the period during which SW2 is ON and, synchronously with it, the second selector switch section 12 is connected to the contact T2, and the waveform of SW3 shows the period during which SW3 is ON and, synchronously with it, the second selector switch section 12 is connected to the contact T3.

Further, in FIG. 23, SWT shows the period during which the transmitter amplifier AT is ON, while SWR shows the period during which the receiver amplifier is ON.

Next, the operation of the radar apparatus according to the present invention shown in FIG. 22 will be described with reference to FIG. 23. In FIG. 23, periods Tch1, Tch2, and Tch3 indicate the ON periods of SW1, SW2, and SW3, respectively.

During the period Tch1, SW1 is ON, and the contact of the second selector switch section 12 is connected to the terminal T1. During the first half of the period Tch1, the transmitter amplifier AT is ON, and the frequency-modulated wave is transmitted from the antenna ATR1. During the second half of the period Tch1, the receiver amplifier AR is ON, and the reflected wave is received by the antenna ATR1.

During the period Tch2, SW2 is ON, and the contact of the second selector switch section 12 is connected to the terminal T2. Then, the same operation, as that described for the period Tch1, is performed.

Likewise, during the period Tch3, SW3 is ON, and the contact of the second selector switch section 12 is connected to the terminal T3. Then, the same operation, as that described for the period Tch1, is performed.

The feature of the present invention is that the plurality of antennas are used for both transmission and reception and alternately switched between transmission and reception; here, during the period that the receiver amplifier AR is ON, the receiver amplifier is control on and off, as in the first embodiment.

With this arrangement, it becomes possible, as in the first embodiment, to prevent the signal components of different channels from mixing with each other when the signals from the mixer 22 pass through the filter 24.

Embodiment 7

FIG. 24 is a diagram showing the antenna channel connection timing according to a seventh embodiment of the present invention for the case of four channels (ch1 to ch4). Waveform W shows the triangular modulation timing, and the connection time of each channel is indicated by a high level of a pulse.

As can be seen from the figure, in the first time interval, the antennas of ch1 and ch2 are selected, and these antennas are connected alternately. In the second time interval, the antennas of ch2 and ch3 are selected, and these antennas are connected alternately. In the third time interval, the antennas of ch3 and ch4 are selected, and these antennas are connected alternately. In the fourth time interval, the antennas of ch3 and ch2 are selected, and these antennas are connected alternately. In this way, adjacent antenna channels are sequentially selected and connected alternately.

While FIG. 24 has shown the case where the number of channels is 4, it will be appreciated that the above description also holds for the case of a larger number of channels.

As described above, two adjacent antenna channels are selected simultaneously and connected alternately, with each adjacent channel acting as a reference channel; accordingly, the phase relationship between the channels can be identified, and thus the phase difference occurring between them can be reduced. That is, in the first time interval, the phase relationship between ch1 and ch2 can be identified, and in the second time interval, the phase relationship between ch2 and ch3 can be identified, while in the third time interval, the phase relationship between ch3 and ch4 can be identified. In this way, the phase relationships between the respective channels ch1 to ch3 can be identified and, by using the relationships for phase correction when combining signals by DBF, a change in the phase angle, which indicates the angle to the target, can be detected.

In FIG. 24, in the first to third time intervals, as the phase relationships between the respective channels ch1 to ch4 can be identified, the angle to the target can be calculated (angle calculation 1). Likewise, in the next fourth to sixth time intervals, as the phase relationships between the respective channels ch1 to ch4 can be identified, the angle to the target can be calculated (angle calculation 2).

The invention claimed is:

1. A radar apparatus comprising:
a transmitter section having an antenna for radiating a transmit signal;
a receiver section having a plurality of antennas for receiving said transmit signal reflected from an object, a first selector switch section for sequentially selecting output terminals of said plurality of antennas one at a time for connection to an input terminal, a first downconverting section for downconverting, by using a portion of said transmit signal, a received signal input from each of said antennas to said input terminal via said first selector switch section, a low-frequency cut-off filter connected to an output of said first downconverting section, and a second selector switch section for connecting an output of said low-frequency cut-off filter to a sequentially selected one of a plurality of A/D converters; and
a digital signal processing section for receiving outputs of said plurality of A/D converters, and for applying prescribed processing to said outputs to detect distance to said object or relative velocity with respect to said object, wherein
said first and second selector switch sections both operate with the same switching period (first period), and
an on-off control section is provided which performs on-off control with a second period shorter than said first period when the output terminal of each of said plurality of antennas is connected to said input terminal.

2. A radar apparatus as claimed in claim 1, wherein said on-off control section is an amplifier provided between said first selector switch section and said first downconverting section, and said amplifier is controlled on and off repetitively with said second period shorter than said first period.

3. A radar apparatus as claimed in claim 1, wherein said on-off control section is contained in said first selector switch section, and said first selector switch section performs on-off control with said second period shorter than said first period when the output terminal of each of said plurality of antennas is connected to said input terminal.

4. A radar apparatus as claimed in claim 1, wherein said first selector switch section is constructed from amplifiers connected to the output terminals of said plurality of antennas, and said output terminals of said plurality of antennas are sequentially selected one at a time for connection to said input terminal by controlling said amplifiers on and off, and wherein, when the output terminal of each of said plurality of antennas is connected to said input terminal, said amplifier connected to said antenna is controlled on and off repetitively with said second period shorter than said first period.

5. A radar apparatus as claimed in claim 1, wherein said A/D converters are sampled periodically with a third period shorter than said second period.

6. A radar apparatus as claimed in claim 1, wherein an amplifier is provided between said first selector switch section and said first downconverting section, and a second downconverting section is provided between said second selector switch section and said A/D converters, and wherein said amplifier and said second downconverting section are controlled on and off repetitively with said second period.

7. A radar apparatus as claimed in claim 1, wherein an amplifier is provided between said first selector switch section and said first downconverting section, and a second downconverting section and a third downconverting section are provided between said second selector switch section and said A/D converters, and wherein said amplifier and said second downconverting section are controlled on and off repetitively with said second period, while said third downconverting section is controlled on and off repetitively with said first period.

8. A radar apparatus as claimed in claim 1, wherein said plurality of antennas for receiving said transmit signal reflected from said object are transmit/receive antennas for radiating said transmit signal, and said plurality of transmit/receive antennas are provided with first connecting means for connecting to said transmitter section and said receiver section in turn and with second connecting means and third connecting means for connecting to said transmitter section and said receiver section, respectively, so that said transmit signal is radiated and said reflected signal received when each of said antennas is connected by said first connecting means, and wherein, when said each antenna is connected to said receiver section, said third connecting means turns on and off the connection with said receiver section.

9. A radar apparatus as claimed in claim 1, wherein said first selector switch section has a configuration for selecting two adjacent antenna channels simultaneously and connecting said adjacent channels to said input terminal in alternating fashion, and wherein, when performing processing in said digital signal processing section, phase correction is applied based on a phase relationship obtained with each of said adjacent channels acting as a reference channel.

* * * * *